United States Patent
Mutsuda (12)

(10) Patent No.: US 6,517,949 B1
(45) Date of Patent: Feb. 11, 2003

(54) POLYACETAL COMPOSITE AND PROCESS FOR PRODUCING THE SAME

(75) Inventor: Mitsuteru Mutsuda, Himeji (JP)

(73) Assignee: Daicel-Huls Ltd., Tokyo (JP)

( * ) Notice: Subject to any disclaimer, the term of this patent is extended or adjusted under 35 U.S.C. 154(b) by 17 days.

(21) Appl. No.: 09/763,458

(22) PCT Filed: Jun. 22, 2000

(86) PCT No.: PCT/JP00/04079
§ 371 (c)(1),
(2), (4) Date: Feb. 23, 2001

(87) PCT Pub. No.: WO00/78542
PCT Pub. Date: Dec. 28, 2000

(30) Foreign Application Priority Data

Jun. 24, 1999 (JP) .............................. 11-177681

(51) Int. Cl.⁷ .................... B32B 25/08; B32B 27/08; B32B 27/30; B32B 27/34; B32B 27/36
(52) U.S. Cl. .................... 428/501; 156/308.2; 156/327; 156/330.9; 156/332; 428/411.1; 428/412; 428/421; 428/477.4; 428/480
(58) Field of Search ............................... 428/501, 412, 428/411.1, 421, 477.4, 480; 525/58, 64, 154, 400; 156/308.2, 330.9, 332, 327

(56) References Cited

U.S. PATENT DOCUMENTS 5,244,946 A * 9/1993 Guest et al. ................ 524/86
5,679,743 A   10/1997 Hirai et al. ................ 525/88

FOREIGN PATENT DOCUMENTS

| EP | 0 771 848 A | 5/1997 |
| EP | 0 823 456 A | 2/1998 |
| EP | 0 919 595 A | 6/1999 |
| JP | A1029276 | 2/1998 |
| JP | A1191040 | 4/1999 |
| WO | A1-0020204 | 4/2000 |

* cited by examiner

Primary Examiner—D. S. Nakarani
(74) Attorney, Agent, or Firm—Birch, Stewart, Kolasch & Birch, LLP

(57) ABSTRACT

A polyacetal composite according to the invention includes a polymer unit (A) composed of a polyacetal resin, and a polymer unit (B) composed of a thermoplastic resin or elastomer having an acidic group, and the polymer unit (A) and the polymer unit (B) directly adhere to each other. The acidic group includes, for example, a carboxyl group and a carboxylic anhydride group. The thermoplastic resin or elastomer having an acidic group includes a comonomer having at least one selected from among acrylic acid, methacrylic acid, fumaric acid, maleic acid, maleic anhydride, and itaconic acid as a comonomer, and typical examples thereof include, for example, acid-modified polystyrene and acid-modified NBR (acid-modified nitrile rubber). In this polyacetal composite, the polyacetal resin and another polymeric material are firmly fixed with each other.

10 Claims, 1 Drawing Sheet

Metal Frame

A    B

Metal Frame    A    B

POLYACETAL COMPOSITE AND PROCESS FOR PRODUCING THE SAME

This application is the national phase under 35 U.S.C. §371 of PCT International Application No. PCT/JP00/04079 which has an International filing date of Jun. 22, 2000, which designated the United States of America.

TECHNICAL FIELD

The present invention relates to a composite member comprising a polyacetal resin and another polymeric material (specifically, an elastic material) directly adhering to each other, as well as to a production process thereof.

BACKGROUND ART

Polyacetal resins were launched into mass production by Du Pont (E.I.) de Nemours & Co. and Celanese Corp. in about the 1960s and have been used in a variety of fields since then, as they are very excellent in fatigue resistance and have satisfactory physical properties in balance such as friction/abrasion resistance, low-noise property, chemical resistance, creep resistance, and dimensional stability. On the other hand, such a polyacetal resin has poor affinity to other organic materials due to its specific chemical structure, as compared with other engineering plastics, and therefore is used alone. Additionally, there is no appropriate adhesive to combine the polyacetal resin with another material, as the polyacetal resin is resistant to adhesion. Specifically, there are strong demands to combine the polyacetal resin with an elastic material to make use of its satisfactory physical properties, but the demands cannot be significantly responded to due to the above technical reasons.

DISCLOSURE OF INVENTION

Accordingly, an object of the present invention is to provide a composite which includes a polyacetal resin and another polymeric material firmly adhering to each other, and a production process thereof.

Another object of the present invention is to provide a composite which includes a polyacetal resin and another polymeric material directly adhering to each other without the medium of an adhesive.

After intensive investigations to achieve the above objects, the present inventors found that heating of a polyacetal resin and a thermoplastic resin or elastomer having an acidic group permits an interface between the both materials to firmly bind and fix with each other. The present invention has been accomplished based on these findings.

Specifically, the present invention provides, in an aspect, a polyacetal composite which includes a polymer unit (A) composed of a polyacetal resin, and a polymer unit (B) composed of a thermoplastic resin or elastomer having an acidic group, and the polymer unit (A) and the polymer unit (B) directly adhere to each other. The acidic group includes, for example, a carboxyl group and a carboxylic anhydride group. The thermoplastic resin or elastomer having an acidic group includes, for example, a copolymer having, as a comonomer, at least one selected from among acrylic acid, methacrylic acid, fumaric acid, maleic acid, maleic anhydride, and itaconic acid. The thermoplastic resin or elastomer having an acidic group includes, for example, an acid-modified polystyrene and an acid-modified NBR (acid-modified nitrile rubber).

In another aspect, the present invention provides a process for producing a polyacetal composite which includes the step of bringing a composition containing a polyacetal resin into contact with a composition containing a thermoplastic resin or elastomer having an acidic group (including the case where the thermoplastic resin or elastomer having an acidic group alone is contained) under heating to thereby yield a composite including a polymer unit (A) composed of the polyacetal resin, and a polymer unit (B) composed of the thermoplastic resin or elastomer having an acidic group, in which the polymer unit (A) and the polymer unit (B) directly adhere to each other.

In the present description, "rubber" and "thermoplastic elastomer" are generically referred to as "elastomer". The term "composition containing a polyacetal resin" also includes the case where the composition contains a polyacetal resin alone. Likewise, the term "composition containing a thermoplastic resin or elastomer having an acidic group" also includes the case where the composition contains the thermoplastic resin or elastomer having an acidic group alone.

BEST MODE FOR CARRYING OUT THE INVENTION

Figure 1:
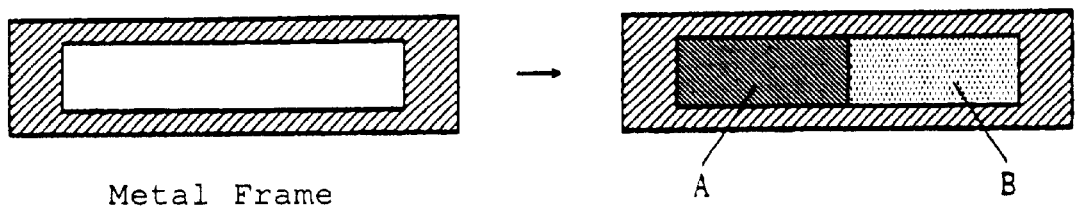
FIG. 1 is a schematic diagram illustrating a production process of a composite according to Example.

In a polyacetal composite according to the present invention, a polymer unit (A) is composed of a polyacetal resin. As the polyacetal resin, polymers each having an acetal bond in a principle chain are acceptable, and polymers derived from formaldehyde which are generically referred to as polyoxymethylenes are specifically preferred. Such polyacetal resins can be prepared by any production process, and there is not restraint in end group.

The polyoxymethylenes include, but are not limited to, α-polyoxymethylene, β-polyoxymethylene, γ-polyoxymethylene, δ-polyoxymethylene, ε-polyoxymethylene, Eu-polyoxymethylene, cyclic polyoxymethylene, and other polyoxymethylenes in which the overall principle chain is composed of oxymethylene structure, as well as those having another unit such as oxyethylene unit than oxymethylene in the principle chain.

Examples of the polyoxymethylenes in which the principle chain is composed of oxymethylene unit alone include "Delrin" of Du Pont (E.I.) de Nemours & Co. and "Tenac" of Asahi Chemical Industry Co., Ltd. The polyoxymethylenes having another unit introduced into a principal chain include, for example, "Celcon" of Celanese Corp., "Duracon" of Polyplastics Co., Ltd., "Iupital" of Mitsubishi Gas Chemical Co., Ltd., "Ultraform" of BASF AG, and "Tenac C" of Asahi Chemical Industry Co., Ltd.

According to necessity, the polymer unit (A) may further comprise, in addition to the polyacetal resin, additional components that are generally incorporated into plastics. Such additional components include, but are not limited to, the other polymers, glass fibers and other fillers, oils and other various added substances, stabilizers, coloring agents, plasticizers, flame-retardants and other various additives.

In the invented polyacetal composite, a polymer unit (B) is composed of a thermoplastic resin or elastomer having an acidic group (e.g., an acid-modified polymer). The acidic group may be contained in any moiety of a principle chain and side chain in the molecular structure of the thermoplastic resin or elastomer. The thermoplastic resin or elastomer having an acidic group may be a single polymer, or a polymer alloy or polymer blend containing at least one polymer having an acidic group. In the latter, the polymer alloy or polymer blend may be composed of a polymer having an acidic group alone or may be a mixture of a polymer having an acidic group with a polymer having no acidic group.

Such acidic groups include, but are not limited to, carboxyl group and sulfonic group, as well as equivalents of these groups such as carboxylic anhydride group. Among them, carboxyl group and carboxylic anhydride group are specifically preferred as the acidic group.

The thermoplastic resin is not specifically limited and includes, for example, styrenic resins having styrene as a principal monomer, acrylic resins having a (meth) acrylic ester as a principle monomer, olefinic resins having an olefin as a principle monomer, vinyl-chloride-based resins having vinyl chloride as a principle monomer, poly(vinyl alcohol)-based resins having vinyl alcohol as a principle monomer, fluororesins, polyamides, polycarbonates, poly(phenylene ether), poly(phenylene sulfide), polyarylates, polysulfones, poly(ether sulfone), and poly(ether ether ketone).

The elastomer includes so-called rubbers and thermoplastic elastomers. Such rubbers include, but are not limited to, isoprene rubber (IR), butadiene rubber (BR), chloroprene rubber (CR), styrene-butadiene rubber (SBR), nitrile rubber (NBR), isobutylene-isoprene rubber (IIR), ethylene-propylene rubbers [ethylene-propylene copolymer (EPM), ternary ethylene-propylene rubber (EPDM)], acrylic rubbers (e.g., ACM and ANM), epichlorohydrin rubber, silicone rubber, fluororubber (FKM), urethane rubber (AU), and chlorosulfonated polyethylene (CSM). The rubbers may be any of vulcanized rubbers and unvulcanized rubbers.

The thermoplastic elastomers include, but are not limited to, styrene-butadiene-styrene block copolymers (SBS), hydrogenated SBS (SEBS), styrene-isoprene-styrene block copolymer (SIS), hydrogenated SIS (SEPS), and other styrene block copolymer-based thermoplastic elastomers; polyurethane-based thermoplastic elastomers; polyester-based thermoplastic elastomers; fluoropolymer-based thermoplastic elastomers; polyamide-based thermoplastic elastomers; and blends (TPO) of polypropylene with EPM or EPDM.

Techniques for introducing an acidic group into the thermoplastic resin or elastomer include, for example, a process in which a polymerizable unsaturated compound having an acidic group such as acrylic acid, methacrylic acid, fumaric acid, maleic acid, maleic anhydride, and itaconic acid is subjected as a comonomer to copolymerization with a major monomer component, and a process in which a monomer mixture containing a monomer having a reactive functional group is polymerized, and the resulting polymer is allowed to react with a compound having both a functional group which is reactive with the above reactive functional group, and an acidic group (e.g., the aforementioned acidic group).

The amount of the introduced acidic group can be appropriately selected within a range not adversely affecting characteristics which the thermoplastic resin or elastomer inherently possesses. Generally, the proportion of the monomer having an acidic group is about 5 to 40% by mole relative to the total monomeric units.

Typical examples of the thermoplastic resin or elastomer having an acidic group include acid-modified polystyrenes containing a carboxylic acid or carboxylic anhydride such as maleic anhydride (e.g., "Dylark D332" produced by Sekisui Chemical Co., Ltd.), and acid-modified NBR (e.g., "Nipol 1472" produced by Nippon Zeon Co., Ltd.).

According to necessity, the polymer unit (B) may further comprise a variety of additives, in addition to the thermoplastic resin or elastomer having an acidic group. Such additives include, for example, vulcanizing agents, vulcanization accelerators, softeners, plasticizers, fillers, age resistors, antioxidants, antiozonants, UV absorbents, tackifiers, lubricants, coloring agents, and flame-retardants. The type and amount of these additives can be appropriately selected depending on required performances of the polymer unit (B).

For example, when the thermoplastic resin or elastomer having an acidic group is a rubber, a vulcanizing agent, vulcanization accelerator, softener, plasticizer, and filler are added. Such vulcanizing agents include conventional vulcanizing agents such as sulfur, sulfur-containing compounds, organic peroxides, and metal oxides. The proportion of the vulcanizing agent is, for example, about 1 to 10 parts by weight relative to 100 parts by weight of the rubber.

The vulcanization accelerator can be appropriately selected depending on the type of the vulcanizing agent. When sulfur or a sulfur-containing compound is used as the vulcanizing agent, for example, benzothiazoles, benzothiazolesulfenamides, dithiocarbamates, xanthogens, thioureas, dithiocarbamylsulfenamides, guanidines, and thiurams are used as the vulcanization accelerator. When an organic peroxide is used as the vulcanizing agent, 1,4-butanediol di(meth)acrylate, trimethylolpropane tri(meth) acrylate, and other (meth)acrylates, triallyl cyanurate, and other triallylates, and meta-phenylenedimaleimides are used as the vulcanization accelerator. The proportion of the vulcanization accelerator can be selected depending on, for example, required physical properties of the rubber, vulcanization rate, and combination of the vulcanizing agent, and is, for example, about 0.5 to 5 parts by weight relative to 100 parts by weight of the rubber.

As the softener, general petroleum process oils such as paraffin oils, naphthene oils, and aromatic oils are used, for example. As the plasticizer, for example, phthalic esters, sebacic esters, adipic esters, phosphoric esters, and other low molecular weight plasticizers, as well as various polyester-based plasticizers, and chlorinated polypropylenes can be used according to the application. The amounts of the softener and plasticizer can be freely selected depending on the required physical properties of the rubber, for example, within a range from about 0 to about 150 parts by weight relative to 100 parts by weight of the rubber.

The fillers include, for example, those used in rubber compositions, such as carbon black, silicic acid, silicates, calcium carbonate, zinc oxide, barium sulfate, magnesium sulfate, talc, and kaolin. The proportion of the filler can be selected within a range from about 10 to about 300 parts by weight relative to 100 parts by weight of the rubber, depending on required physical properties of the rubber.

The polymer unit (B) is preferably (a) those containing a polymer having —CH=CH—bond or —CH=C(CH$_3$)— bond in a principle chain or side chain as the acidic-group-containing polymer or another polymer (e.g., polymers having a diene such as butadiene or isoprene as a (co-) monomer), and (b) those containing a vulcanizing agent as the composition, of which those satisfy the both conditions (a) and (b) are especially preferred.

The invented polyacetal composite can be produced by bringing, underheating, a composition containing a polyacetal resin into contact with a composition containing a thermoplastic resin or elastomer having an acidic group. A heating temperature is higher than the glass transition temperature of the polyacetal resin constituting the polymer unit (A). Additionally, when the polymer constituting the polymer unit (B) is a thermoplastic resin, the heating temperature is higher than the glass transition temperature of the thermoplastic resin. When the polymer constituting the polymer unit (B) is a rubber and the polymer unit (A) is brought in adhesion with the polymer unit (B) concurrently with vulcanization, the heating temperature should be preferably selected within a range of vulcanization temperatures (e.g., about 110° C. to 220° C.). Generally, the heating temperature of the composition containing the polyacetal resin and the composition containing the thermoplastic resin or elastomer having an acidic group is about 120° C. to 200° C.

The heating and contact operation of the composition containing the polyacetal resin and the composition containing the thermoplastic resin or elastomer having an acidic group can be performed under a pressure. The pressure in this case is, for example, about 50 to 2000 kgf/cm², and a compression-bonding time is, for example, about 10 seconds to 60 minutes.

More specifically, the invented polyacetal composite can be produced, for example, by (i) bringing a molded article, which is obtained by optionally molding a composition containing the polyacetal resin, into contact with a composition containing the thermoplastic resin or elastomer having an acidic group (e.g., pellet-form or powdered composition) under heating. The molded article can be obtained by any conventional molding techniques such as hot press, injection molding, and extrusion molding. The heating operation is generally performed in a mold meeting the shape of the target article, but the operation does not necessarily require a mold when the target shape is, for example, a sheet or film. When a rubber is used as the thermoplastic resin or elastomer having an acidic group, the rubber may be a vulcanized rubber or unvulcanized rubber. Especially, when an unvulcanized rubber is used, an appropriate pressure should be preferably applied to efficiently degas volatile components or gaseous components in the unvulcanized rubber. Specifically, hot press or injection molding, for example, is used in the heating step. In this connection, when an unvulcanized rubber is used, a satisfactory composite can be obtained by vulcanizing the rubber in this step.

The invented polyacetal composite can also be obtained by (ii) bringing a molded article, which is obtained from a composition containing the thermoplastic resin or elastomer having an acidic group by a conventional molding technique, into contact with a composition containing the polyacetal resin (e.g., pellet-form or powdered composition) for example in a mold under heating (and where necessary under a pressure). Also in this case, hot press or injection molding or another technique is employed.

Alternatively, the invented polyacetal composite can be obtained by (iii) melting one composition of the composition containing the polyacetal resin and the composition containing the thermoplastic resin or elastomer having an acidic group, and adding a molded article of the other composition to the melted composition, kneading the mixture, and cooling the kneaded product. In this case, the shape of the molded article added to the melted composition is not specifically limited.

The invented polyacetal composite can be used in a wide range of applications such as gears, rollers, seismicisolators, vibration insulators, and sliding members.

INDUSTRIAL APPLICABILITY

The present invention can combine a polyacetal resin with another polymeric material, specifically with an elastic material, and the resulting composite has a very high adhesion strength in its composite interface. Additionally, the polyacetal resin is directly bonded to the other polymeric material and the use of an adhesive or a special treatment is not required, to thereby simplify the steps to a great extent. Furthermore, the production does not require the use of a harmful solvent.

EXAMPLES

The present invention will be illustrated in further detail with reference to examples below, which are not intended to limit the scope of the invention.

[Material]

A1: polyacetal resin ["Duracon M90-44" produced by Polyplastics Co., Ltd. (a polyoxymethylene having oxyethylene unit introduced as part of a principle chain)]

A2: polyacetal resin ["Duracon GH 25" produced by Polyplastics Co., Ltd. (a polyoxymethylene having oxyethylene unit introduced as part of a principle chain; containing 25% by weight of glass short fiber)]

A3: polyacetal resin ["Tenac SH 210" produced by Asahi Chemical Industry Co., Ltd. (a polyoxymethylene comprising oxymethylene unit alone in a principle chain)]

B1: thermoplastic resin; pellet-form maleic-anhydride-copolymerized polystyrene ["Dylark D 332" produced by Sekisui Chemical Co., Ltd.]

B2: thermoplastic elastomer; one obtained by melting and kneading SBS block copolymer ["TR-2000" produced by JSR] and a maleic-anhydride-copolymerized polystyrene ["Dylark D 332" produced by Sekisui Chemical Co., Ltd.] in a weight ratio of 1:1, and palletizing the resulting mixture B3: rubber; a clayey composition comprising 100 parts by weight of an acid-modified NBR ["Nipol 1472 produced by Nippon Zeon Co., Ltd.], 30 parts by weight of white carbon, 10 parts by weight of calcium silicate, 1 part by weight of stearic acid, 2 parts by weight of carbon black, 20 parts by weight of a plasticizer ["Vulkanol 88" produced by Bayer AG], 0.8 part by weight of a vulcanizing agent (BDMA), and 5 parts by weight of a vulcanization accelerator ("Trigonox 17/40" produced by Akzo).

B4: rubber; one obtained by heating and pressing B3 through hot press at 170° C. for 10 minutes to thereby vulcanize and mold the same (4 mm thick, 25 mm×60 mm)

B5: rubber; a clayey composition comprising 90 parts by weight of EPDM ["BUNA AP 447" produced by Bayer AG], 10 parts by weight of a polyoctenylene rubber ["Vestenamer8012" produced by Huels AG], 5 parts by weight of zinc oxide, 72 parts by weight of carbon black, 1 part by weight of an age resistor ["Vulkanox HS" produced by Bayer AG], 1.25 parts by weight of a vulcanization accelerator (trimethylolpropane trimethacrylate), and 5.5 parts by weight of a vulcanizing agent ["Perkadox 14/40" produced by Kayaku Akzo Corporation]

B6: rubber; one obtained by heating and pressing B5 through hot press at 170° C. for 10 minutes to thereby vulcanize and mold the same (4 mm thick, 25 mm×60 mm)

B7: rubber; a clayey composition comprising 80 parts by weight of a natural rubber, 20 parts by weight of SBR, 4 parts by weight of zinc oxide, 59 parts by weight of carbon black, 1 part by weight of stearic acid, 1.2 parts by weight of an age resistor ["Antage RD" produced by Kawaguchi Chemical Ind.], 2 parts by weight of an age resistor ["Antage 3C" produced by Kawaguchi Chemical Ind.], 2 parts by weight of an anti-ozone wax ["Ozone-Guard G" produced by Kawaguchi Chemical Ind.], 0.8 part by weight of a vulcanization accelerator (CBS), 0.2 part by weight of an antiscorching agent ["Vulkalent E" produced by Bayer AG], and 5 parts by weight of a vulcanizing agent ["Sulfax" produced by Tsurumi Kagaku Kogyo K.K.]

B8: rubber; one obtained by heating and pressing B7 through hot press at 170° C. for 10 minutes to thereby vulcanize and mold the same (4 mm thick, 25 mm×60 mm)

Example

As shown in FIG. 1, a molded article of polyacetal resin A (A1 to A3) 4 mm thick 25 mm×60 mm was placed in a hole 4 mm thick 25 mm×120 mm of a metal frame in such a manner that one end of the molded article in a length direction was in contact with an inner wall of the metal frame, and thermoplastic resin or elastomer B (B1 to B8) (about 6.5 cm$^3$ in case of B1 to B3, B5, and B7) was placed in such a manner that an end of the thermoplastic resin or elastomer B was in contact with the other end of the molded article of A in the length direction. These were hot-pressed at 170° C. at a pressure of 600 kgf/cm$^2$ for 10 minutes, and then cooled by pressing with a water-cooled press for further 1 minute, and the molded composite was taken out from the metal frame.

One end of the unit A and the other end of the unit B were held by hand respectively, and were pulled sideways, and adhesion strength was evaluated according to the following criteria. The test results in combinations of A with B are shown in Table 1.

O: Unit A and unit B were not peeled

X: Unit A and unit B were readily peeled in interface

TABLE 1

|    | B1 | B2 | B3 | B4 | B5 | B6 | B7 | B8 |
|----|----|----|----|----|----|----|----|----|
| A1 | O  | O  | O  | O  | X  | X  | X  | X  |
| A2 | O  | O  | O  | O  | X  | X  | X  | X  |
| A3 | O  | O  | O  | O  | X  | X  | X  | X  |

What is claimed is:

1. A polyacetal composite comprising a polymer body (A) composed of a polyacetal resin adhered by direct interface to a polymer body (B) composed of a thermoplastic resin or elastomer having an acidic group and selected from the group consisting of styrenic resins, (meth)acrylate resins, vinyl chloride resins, poly(vinyl alcohol) resins, fluororesins, polyamides, polycarbonates, poly(phenylene ether) resins, poly(phenylene sulfide) resins, polyarylates, polysulfones, poly(ether sulfone) resins, poly(ether ether ketone) resins, and elastomers.

2. The polyacetal composite according to claim 1, wherein said acidic group is a carboxyl group or a carboxylic acid anhydride group.

3. The polyacetal composite according to claim 1, wherein said thermoplastic resin or elastomer body having an acidic group is a copolymer having, as a comonomer, at least one member selected from the group consisting of acrylic acid, methacrylic acid, fumaric acid, maleic acid, maleic acid anhydride, and itaconic acid.

4. The polyacetal composite according to claim 1, wherein said thermoplastic resin or elastomer having an acidic group is an acid-modified polystyrene or an acid-modified nitrile butadiene rubber.

5. The polyacetal composite according to claim 1, wherein said elastomer is at least one selected from the group consisting of rubbers, polyurethane-based thermoplastic elastomers, polyester-based thermoplastic elastomers, fluoropolymer-based thermoplastic elastomers, polyamide-based thermoplastic elastomers, and blends of polypropylene with ethylene-propylene copolymer or ternary ethylene-propylene rubber.

6. The polyacetal composite of claim 1, wherein said polymer body (A) further comprises at least one additional component selected from the group consisting of other polymers, fillers, oils, stabilizers, coloring agents, plasticizers, and flame-retardants.

7. The polyacetal composite of claim 1, wherein said polymer body (B) further comprises at least one additional component selected from the group consisting of vulcanizing agents, vulcanization accelerators, softeners, plasticizers, fillers, age resistors, antioxidants, antiozonants, UV absorbents, tackifiers, lubricants, coloring agents and flame-retardants.

8. The polyacetal composite of claim 1, which is produced by bringing the polymer body A into contact with a polymer body B-forming composition under heating.

9. The polyacetal composite of claim 1, which is produced by bringing the polymer body B into contact with a polymer body A-forming composition under heating.

10. A process for producing a polyacetal composite comprising a polyacetal resin body (A) adhered by direct interface to a polymeric or elastomeric resin body (B), said process comprising the step of bringing, under heating, either a polyacetal resin into contact with a thermoplastic resin or elastomer body, having an acidic group and selected from the group consisting of styrenic resins, (meth)acrylate resins, vinyl chloride resins, poly(vinyl alcohol) resins, fluororesins, polyamides, polycarbonates, poly(phenylene ether) resins, poly(phenylene sulfide) resins, polyarylates, polysulfones, poly(ether sulfone) resins, poly(ether ether ketone) resins, and elastomers, or a thermoplastic resin or elastomer, having an acidic group and selected from the group consisting of styrenic resins, (meth)acrylate resins, vinyl chloride resins, poly(vinyl alcohol) resins, fluororesins, polyamides, polycarbonates, poly(phenylene ether) resins, poly(phenylene sulfide) resins, polyarylates, polysulfones, poly(ether sulfone) resins, poly(ether ether ketone) resins, and elastomers, into contact with a polyacetal resin body, to thereby yield a composite comprising a polymer body (A) composed of the polyacetal resin adhered by direct interface to a polymer body (B) composed of the thermoplastic resin or elastomer having an acidic group.

* * * * *